United States Patent
Thomas

[19]
[11] Patent Number: 6,050,754
[45] Date of Patent: Apr. 18, 2000

[54] SELF-CENTERING DRILL BIT WITH PILOT TIP, AND PROCESS

[75] Inventor: Rickey J. Thomas, Lineboro, Md.

[73] Assignee: Black & Decker Inc., Newark, Del.

[21] Appl. No.: 09/087,157

[22] Filed: May 29, 1998

Related U.S. Application Data

[60] Provisional application No. 60/048,016, May 29, 1997.

[51] Int. Cl.[7] .............................. B23B 51/02; B24B 19/04
[52] U.S. Cl. ..................... 408/230; 76/108.6; 408/224; 408/229; 408/226; 451/48
[58] Field of Search ..................... 408/223–226, 408/229, 230, 715; 76/108.6; 451/48

[56] References Cited

U.S. PATENT DOCUMENTS

| | | | |
|---|---|---|---|
| 460,639 | 10/1891 | Holt | 408/230 |
| 542,223 | 7/1895 | Johnson | 408/230 |
| 1,499,584 | 7/1924 | Litchfield | 408/224 |
| 1,984,839 | 12/1934 | Murray | 408/226 |
| 2,193,186 | 3/1940 | Bannister . | |
| 2,332,295 | 10/1943 | Bouchal . | |
| 2,652,083 | 9/1953 | Emmons . | |
| 2,936,658 | 5/1960 | Riley . | |

(List continued on next page.)

FOREIGN PATENT DOCUMENTS

| | | | |
|---|---|---|---|
| 0097879 | 10/1990 | European Pat. Off. . | |
| 23 58 048 | 5/1975 | Germany . | |
| 2629130 | 1/1978 | Germany | 451/48 |
| 78 33 000 | 4/1980 | Germany . | |
| 29 46 103 | 5/1981 | Germany . | |
| 85 36 123 | 5/1987 | Germany . | |
| 4117486 | 12/1992 | Germany . | |
| 41 17 486 | 7/1995 | Germany . | |
| 226209 | 10/1986 | Japan | 408/230 |
| 3-184707 | 8/1991 | Japan . | |
| 4-244311 | 9/1992 | Japan . | |
| 675-842 | 11/1990 | Switzerland . | |
| 1238905 | 6/1986 | U.S.S.R. | 408/230 |

OTHER PUBLICATIONS

*Twist Drills Standard (ASME B94.11–M–1993)*, The American Society of Mechanical Engineers, pp. 1–3, 7–33, 48, 49, 56–59 (Mar. 31, 1994).

(List continued on next page.)

*Primary Examiner*—Steven C. Bishop
*Attorney, Agent, or Firm*—Charles E. Yocum

[57] ABSTRACT

Significantly improved resistance to breaking while drilling in metal can be realized in twist drill bits having a web thickness taper which is about twice the web thickness taper specified in Standards and in common use in the industry. This creates much shallower flutes and flies in the face of conventional wisdom in the art which holds that the web taper rate should be low to maximize the amount of flute volume available to convey chips and sawdust out of the hole. A flute length of about ½" less than the flute lengths specified by the Standards makes it possible to have such a large taper rate but still control variations in tolerances for the flute length. It also provides a marking zone for placing size indicia on the drill bit shank outside the portion which is, ripped by the chuck jaws of a power drill. The use of the new web taper rate, in conjunction with modifications to the tip geometry of a self-centering drill bit with pilot tip, produces a drill bit optimized both for metal and wood drilling which is strong enough to withstand the forces exerted on the bit while drilling in metal using a hand-held power drill, yet which need not be retracted from a 2×4 to clear sawdust prior to drilling a hole completely through the thickness of the wood.

58 Claims, 4 Drawing Sheets

U.S. PATENT DOCUMENTS

| | | |
|---|---|---|
| 3,387,511 | 6/1968 | Ackart, Sr. et al. . |
| 3,592,555 | 7/1971 | Mackey, Sr. . |
| 3,779,664 | 12/1973 | Caley et al. ............................ 408/230 |
| 4,340,327 | 7/1982 | Martins ................................. 408/225 |
| 4,529,341 | 7/1985 | Greene .................................. 408/230 |
| 4,556,347 | 12/1985 | Barish . |
| 4,756,650 | 7/1988 | Wakihira et al. . |
| 4,898,503 | 2/1990 | Barish . |
| 4,968,193 | 11/1990 | Chaconas et al. . |
| 4,983,079 | 1/1991 | Imanaga et al. . |
| 5,011,342 | 4/1991 | Hsu . |
| 5,056,967 | 10/1991 | Hageman ............................... 408/230 |
| 5,088,863 | 2/1992 | Imanaga et al. . |
| 5,288,183 | 2/1994 | Chaconas et al. . |
| 5,442,979 | 8/1995 | Hsu . |

OTHER PUBLICATIONS

*National Aerospace Standard (NAS 907)*, Aerospace Industries Association of America, Inc. pp. 1–25 (1986).

*Introduction to Mechanics of Solids*, Popov, Egar P., "Design of Nonprismatic Beams". pp. 360–362 (1968).

*Black & Decker 1983–84 Consumer Trade Catalog*, Top of p. 28 showing high speed drill bits, (1983) and enlargement.

SELF-CENTERING DRILL BIT WITH PILOT TIP, AND PROCESS

CROSS-REFERENCE TO RELATED APPLICATION

This application is based upon and claims priority to U.S. Provisional Patent Application Ser. No. 60/048,016 filed May 29, 1997, and entitled "Improved Self-Centering Drill Bit with Pilot Tip", the specification and drawings of which are herein expressly incorporated by reference.

FIELD OF THE INVENTION

The invention relates to twist drill bits having flutes that extend from a tip of the drill bit to a termination point on the shank. The drill bit flutes define a web thickness which increases along the length of the flute from the tip to the termination point. The invention uses a much steeper web taper rate than is used in the industry. It has been discovered that bits employing the present invention experience significantly enhanced toughness and resistance to breakage in metal, yet still perform well in wood. This enhanced effect is particularly pronounced when the drill bit is driven by a portable drill.

BACKGROUND OF THE INVENTION

Conventional wisdom in the art holds that it is advisable to use a relatively shallow web taper rate in twist drills so that the flute depth along the length of the flute is as great as practicable. This should provide the maximum amount of volume to convey chips, swarf or sawdust back from the tip and out of the hole being drilled. This convention is embodied in two Standards: The American Society of Mechanical Engineers (ASME B94.11M-1993), and The National Aerospace Standard of the Aerospace Industries Association of America, Inc., (NAS 907) (hereinafter collectively referred to as "Standards"), both of which Standards are specifically incorporated in their entireties by reference herein. The Assignee of the present invention has been selling conventional Jobber-length, straight-shank drill bits which have parameters that track the Standards, and which have conventional web thickness taper rates between 0.024 inches to 0.030 inches. Also, it has been selling a self-centering drill bit with pilot tip under the BULLET® trademark having a web taper rate of about 0.027 inches per inch of flute length. This self-centering drill bit was designed with the end user who uses a portable drill in mind, particularly one who desires a bit which is optimized to drill in both metal and wood. The first versions of these bits are disclosed in U.S. Pat. Nos. 4,968,193, issued Nov. 6, 1990, to Chaconas et al., and 5,288,183, issued Feb. 22, 1994, to Chaconas et al., each of which is assigned to the same Assignee of the present invention. The entire disclosures of each of these two patents are also specifically incorporated by reference herein.

One of the needs of an operator who uses the bit in a hand-held power drill is increased toughness, or resistance to breaking (typically in the flute portion of the drill bit). The increased robustness is needed because in metal drilling the portable power drill user puts considerable side stresses on the drill bit, not having the stability that a drill press provides. However, the BULLET® drill bit, which was optimized to drill well both in metal and in wood, not only needs strength while drilling metal, it also must drill holes through wood with a minimum of "woodpeckering", that is, repetitively retracting and reinserting the drill bit to clear the flutes of sawdust. There is also a need to enhance the BULLET® drill bit's longevity if it should be subjected to an overspeed condition in metal, as well as the strength in its tip portion. Finally, there is a need to reduce its tendency to produce a disc in laminated materials.

SUMMARY OF THE INVENTION

It has been discovered that by defying convention, and instead, using a radically-increased web taper rate, a much more robust drill bit will be created. In addition, it has been discovered that a particular range of increased web taper rates will not only provide sufficiently enhanced robustness or strength when drilling in metal, it simultaneously provides a bit which minimizes the amount of woodpeckering required when drilling wood. Accordingly, it is an object of the present invention to manufacture a twist drill bit having a web thickness taper rate over the length of the flute which is about twice as great as the web taper rate of conventional drill bits, thereby providing significantly increased resistance to breakage while drilling in metal, yet, for drill bits having nominal diameters of 0.250 inch or greater, enabling the user to drill holes in inch and one-half thick wood in one pass.

It is a particular object of the preferred embodiments of the invention to provide a twist drill bit in which the web thickness increases from the tip to the shank portion at a uniform taper rate along the length of the flute in the range from about 0.050 inch to about 0.071 inch per inch of flute length. It is yet another particular object of the preferred embodiments of the invention to provide a bit marking zone on the shank portion of the drill bit which is outside of the area of the shank typically gripped by the jaws of a chuck in which the drill bit is inserted.

A feature by which the above objects may be attained is by forming the flutes with the web taper rate of the present invention along a flute length which is less than the flute length specified for a predetermined bit nominal diameter by the ASME B94.11-M-1993 Standard, and specifically by reducing the flute length by about 0.3 inch to about 0.7 inch. Optimally, the flute length is reduced by about one-half inch, for all nominal diameters of the drill bits. A preferred feature is to form indicia such as the nominal size of the bit, in the marking zone, so that in the engagement by the chuck of the bit shank does not erase the indicia.

Another feature by which the above objects can be attained is in the manufacturing process: causing relative axial movement between a grinding wheel and drill bit stock while rotating the drill bit stock about its axis, grinding the flute having the desired flute length with the web thickness taper rate of the present invention, then retracting the grinding wheel from the drill bit stock upon reaching a point which is a predetermined distance before the point at which the flute would terminate at the shank if the taper rate were to be maintained.

It is yet another object of the present invention to enhance the robustness of self-centering drill bits with pilot tip of the type sold under the trademark BULLET®. One feature by which the above object can be attained is by optionally providing the drill bit tip portion with a fishtail angle of less than 180°. Yet another preferred feature is to form a chamfer adjacent the fishtail such that a cutting edge on the chamfer connects a cutting lip on the fishtail with the outer diameter of the drill bit. Still another preferred feature is to provide the pilot portion with a back taper in the axial direction. Another preferred feature is to provide a back taper which is at least 1° negative. And yet another feature is to size the width or diameter of the pilot portion to be about one-half the nominal bit diameter.

Other objects, features and advantages of the present invention will become more fully apparent from the following detailed description of the preferred embodiments, the appended claims and the accompanying drawings.

BRIEF DESCRIPTION OF THE DRAWINGS

In the accompanying drawings, in which like reference characters in the same or different Figures indicate like part.

DETAILED DESCRIPTION OF PREFERRED EMBODIMENTS

Figure 1:
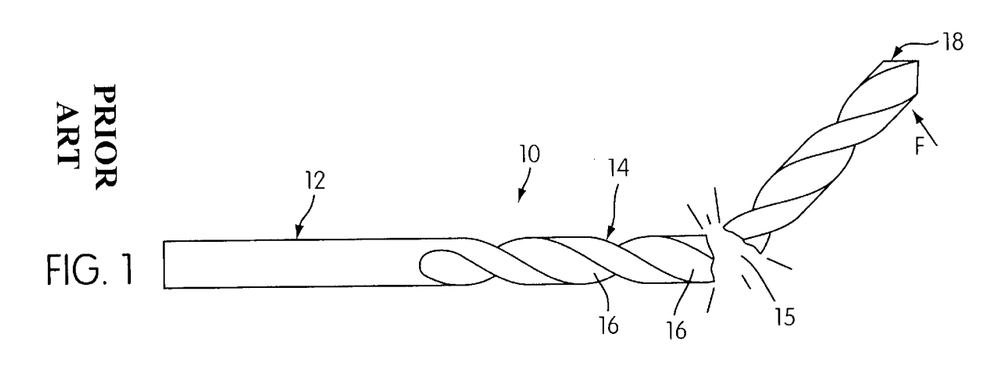
FIG. 1 is a side elevational schematic view of a conventional drill bit to which a force F is applied to such an extent that the bit breaks, usually in the flute portion.

Referring first to FIG. 1, a conventional twist drill bit is shown generally as 10, and includes a shank portion 12, a flute portion 14 containing two flutes 16 and a tip portion 18. When drilling in metal with a portable power drill, the drill bit 10 encounters greater than normal forces F transverse to the axis of the drill bit, as shown schematically in FIG. 1. If the force F is great enough, the drill bit will break or fail as shown at 15. Tests run on a quarter inch diameter conventional twist drill bit 10 found that the failure 15 occurred primarily in the fluted portion 14, when the bit was subjected to a peak force at failure in the range from 150 to 175 lbs.

Figure 2:
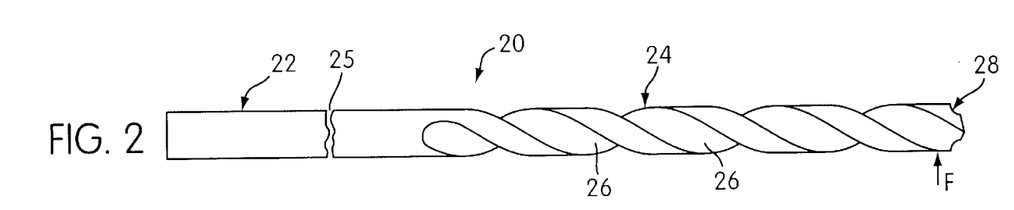
FIG. 2 is a side elevational schematic view of a twist drill bit according to the present invention in which a much higher force F must be applied to break the drill bit.

A twist drill using the taper rate of the present invention is shown generally as 20 in FIG. 2, and includes shank portion 22, flute portion 24 having two flutes 26, and a tip portion 28. In tests of quarter inch nominal diameter twist drill bits incorporating the taper rate of the present invention, it took a peak force at failure in the range of 250 to 300 lbs. to break the bit. In most cases the break occurred not in the fluted portion 24, but in the strongest part of the bit, namely the shank portion 22. This result was attained using the same hardness of the bit steel as conventional bits. The first three quarters of the fluted portion is maintained at full hard, decreasing to a lesser hardness from that point to the end of the shank.

Figure 3:
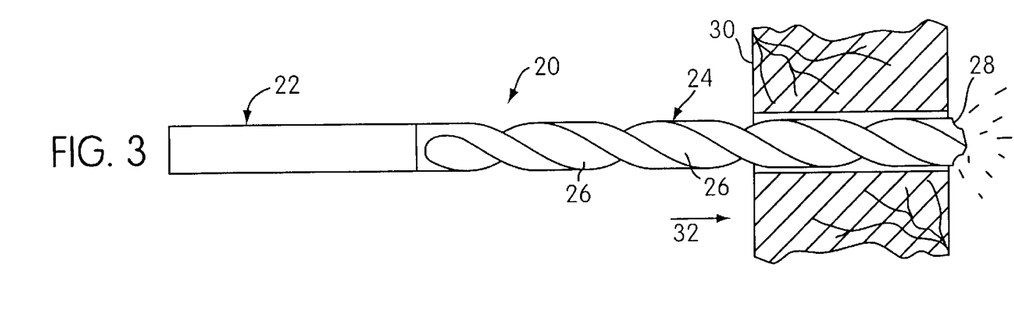
FIG. 3 is a side elevational schematic view of a twist drill bit according to another embodiment of the present invention to which a force F is applied to cause the bit to break outside the flute portion.

FIG. 3 shows an alternate embodiment of a twist drill incorporating the web thickness taper rate of the present invention, and illustrates its ability to perform well in wood while still exhibiting its enhanced strength while drilling in metal. It has been found that a twist drill bit made according to the invention shown in FIG. 3 and having a nominal bit diameter of ¼" can be used to drill a hole through a 1-½" thick piece of wood 30, such as 2×4, without withdrawing the bit to clear the sawdust from the flutes and then reinserting the bit to finish the hole. Thus the present invention embodied in the twist drill bit shown in FIG. 3 reduces the amount of "woodpeckering", so that the operator can use a ¼" metal-drilling drill bit to drill a hole through the board 30 in one pass, as indicated by arrow 32. The web taper rates of the present invention are shown schematically in various drill bits in FIGS. 4 through 7.

Figure 4:
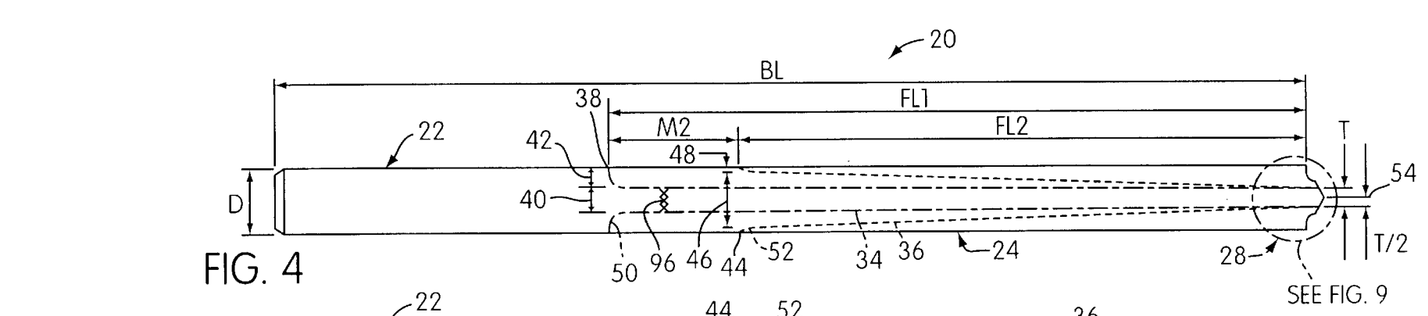
FIG. 4 is a schematic detail view of the drill bits of FIGS. 2 and 3 superimposed upon the drill bit of FIG. 1, employing the web taper rates of the present invention.

FIG. 4 schematically illustrates the web taper of the present invention (shown in short dashes) superimposed upon the web taper of a conventional bit (shown as long and short dashes). The profile of the conventional web taper is referred to as 34, and the web profile of the present invention is referred to as 36.

The most common drill bit used by the person operating a hand-held power drill is known as a "Jobber's-length, straight-shank drill bit", specifications for which are common in the industry and are set out in the Standards. These Standards collectively set forth commonly-accepted ranges of drill bit parameters for various nominal bit diameters, and further reflect conventional wisdom in the art of drill bit technology. As previously noted, these teachings hold that the more chips or sawdust a flute can remove from the hole being drilled, the better. To that end, conventional wisdom in the art dictates that the web thickness should taper outwardly from the tip towards the shank at a very gradual rate. For example, the NAS 907 Standard specifies that the web taper rate for Types "A", "B" and "J" straight shank, Jobber's length drill bits be uniform tapers of 0.017", 0.024" and 0.006", respectively, with respective tolerances of plus or minus 0.003", plus or minus 0.003", and plus or minus 0.002", respectively. Indeed the taper rates of conventional bits sold by the Assignee of the present invention follow this teaching. For example, certain drill bits sold under the DeWALT® trademark have a web taper rate of 0.024" inches per inch of flute length for drill bit nominal diameters up to and including ³⁄₁₆", and a web taper rate of 0.030 inches per inch of flute length for drill bits having nominal diameters greater than ³⁄₁₆ inch. As previously noted, self-centering drill bits having pilot tips sold under the BULLET® trademark have a web taper rate of 0.027 inches per inch of flute length.

Referring once again to FIG. 4, bits following the teaching of the Standards have flutes along the flute portion 24 which exit at a termination point 38 with the outer diameter of the shank portion 22, the shank portion being defined as the portion of the drill bit outside of the portion that contains the flute and which is inserted in the chuck of a power drill. Here the web thickness of the conventional web profile 34 increased from a thickness T to a thickness designated by 40 at termination, leaving a relatively large flute depth 42 for receiving the chips or sawdust. In marked contrast, the web taper profile 36 of the present invention exits the bit 20 at a flute termination point 44. This provides a much thicker web 46 at the flute termination point 44 and yields a very small flute depth 48 at that point. Note that the flute grinding wheel has left a relatively large radius portion 50 at the conventional flute termination point 38, but a relatively small radius 52 at the flute termination point 44 of the present invention.

In one embodiment of the present invention a uniform web taper rate of 0.068 inch per inch of flute length was found to provide durability that far exceeded expectations. The peak transverse force F at failure applied to a rotating cantilever-mounted drill bit exceeded 250 lbs. (for a ¼ inch nominal diameter drill bit), with very acceptable chip removal characteristics when drilling in metal. In another embodiment of the present invention with the same nominal diameter, the web thickness taper rate was set at 0.054 inches per inch of flute length (plus or minus 0.003 inches) for all sizes of drill bits from ⅛ inch nominal diameter to ½ inch nominal diameter. Not only did the drill bit exhibit the same strength characteristics, but it reduced the amount of wood-peckering when drilling wood. It was able to drill a hole in 1-½ inch thick wood (such as a 2×4) in one pass. The web thickness T at the tip or point in the preferred embodiment generally follows the NAS 907 Standard, and for that matter, the other parameters of bits according to the preferred embodiments generally follow one or more of the Chaconas et al. teachings or the Standards, unless otherwise specified herein.

The other drill bit parameters pertaining to the drill bit shown in FIG. 4 and to the other embodiments are as follows: "D" stands for the nominal diameter of the drill bit; "BL" stands for the bit length (note that it does not extend to the tip but instead to the axially forwardmost point of the bit where the flute cuts the outer diameter of the bit); "FL1" stands for the flute length of a flute having a conventional web thickness taper rate and is the flute length referred to in the previously-identified Standards; and "FL2" is the flute length of one of the preferred embodiments of the present invention, created by diminishing FL1 by a predetermined amount MZ. As will be described shortly, selecting FL2 in this fashion confers a double benefit upon the drill bit of the present invention.

Still referring to FIG. 4, for the most part, the parameters just described, and those in the Standards, pertain to a double-flute, straight shank, Jobber's length drill bit. However, it is believed that the concept of the present invention will also have utility in the environment of a drill bit with a single flute. In that case, instead of measuring the taper rate of a web thickness T, the taper rate of the shortest radial distance between the flute and the axis 54 of the drill bit (T/2) would be specified. In either event, the preferred web thickness taper rate ranges from about 0.050 inch to about 0.071 inch per inch of flute length, and the flute length FL lies in the range from about 0.3 inch to about 0.7 inch less than the flute length specified by the ASME Standard.

Ideally, MZ is about ½ inch for all nominal bit diameters in the range of from ⅛ inch through ½ inch. Although it is anticipated that the web taper rate of the present invention will do well in a drill bit having a conventional chisel point or web-thinned point (such as a split point) as schematically shown in FIG. 6, it is particularly useful in the unitary metal/wood-drilling, self-centering drill bit with pilot tip developed by the Assignee of the present invention, and as further described in the Chaconas et al. patents cited above.

Figures 5, 6:
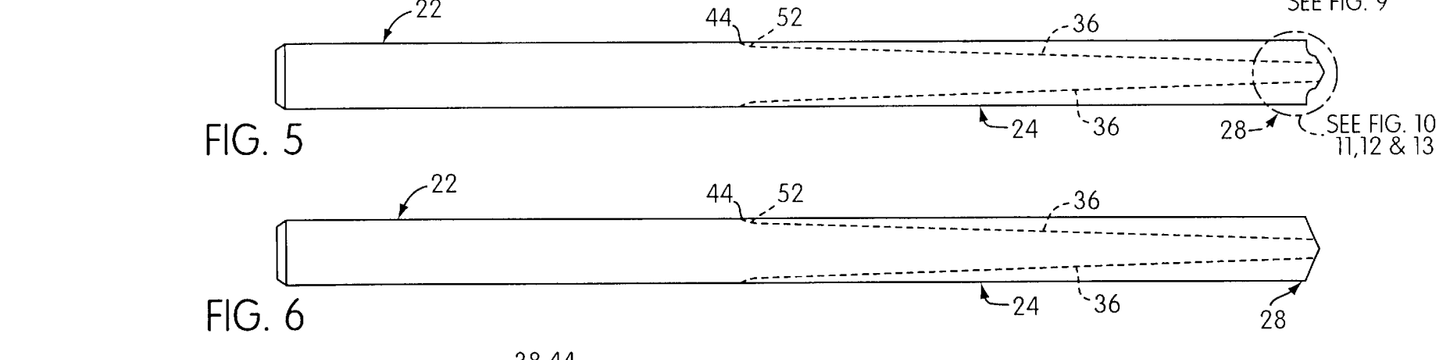
FIG. 5 is similar to FIG. 4, but illustrating solely a web taper rate of the present invention, in combination with a pilot tip of the present invention.
FIG. 6 is similar to FIG. 5, but illustrating the web taper rate of the present invention in a conventional twist drill bit.
Figure 7:
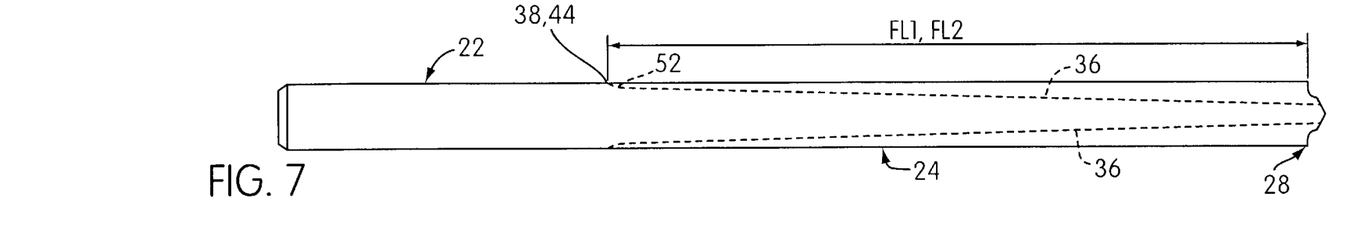
FIG. 7 is a view similar to the view of FIG. 5, illustrating an embodiment of the present invention in which the flute length is the same as the conventional flute length.

These embodiments of the drill bits incorporated the web-taper rate of the present invention are shown in FIGS. 4 and 5, which bits can be equipped with any of the tip portions 28 shown in FIGS. 9 through 13.

Figure 9:
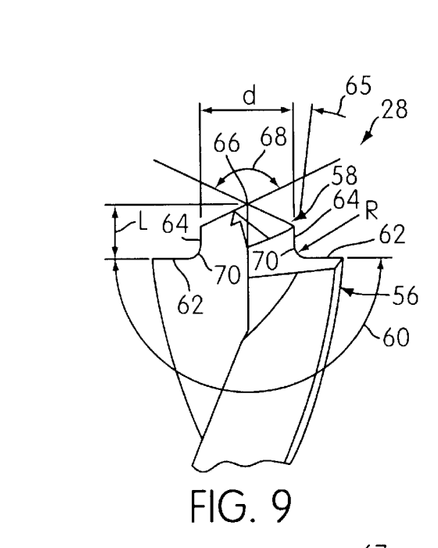
FIG. 9 is an elevational detail schematic view of the tip portion of a self-centering drill bit having a pilot tip.
Figure 10:
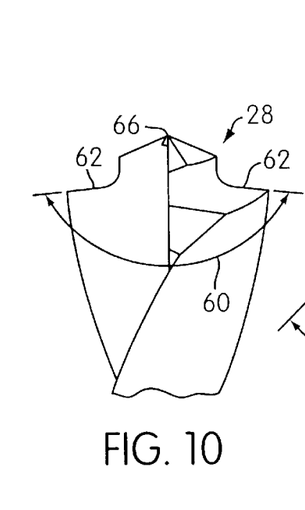
FIG. 10 is one embodiment of an improved tip portion according to the present invention.
Figure 11:
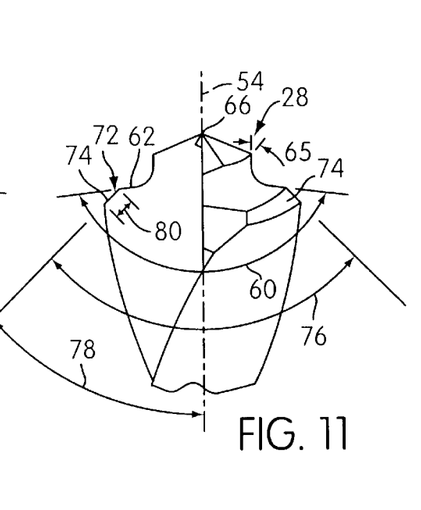
FIG. 11 is another embodiment of the tip portion of the present invention.

The nomenclature of the parameters for these embodiments are noted in FIGS. 9 and 11. The tip portion 28 includes a fishtail portion 56 and a pilot portion 58 extending axially outwardly from the fishtail portion. The fishtail portion 56 includes fishtail cutting lips 62 arranged at a fishtail angle 60. In this embodiment, the cutting lips extend from the pilot portion to the outer diameter of the drill bit. The pilot portion 58 extends a distance "L" from the fishtail portion 56, and has a diameter "d" smaller than the nominal diameter "D" of the drill bit. The pilot portion 58 defines an annular pilot wall 64 which is both radially and axially relieved as taught in the above-identified Chaconas et al. patents. The pilot portion 58 is formed with pilot cutting lips arranged at a point angle 68 (for example 135°) and, in the preferred embodiment, defines a split point 66. The pilot portion 58 is joined to the fishtail portion 56 with a radially-relieved fillet 70 having a radius "R". The drill bit has the following parameters: the fishtail angle 60 is greater than 180°, namely about 190°, and the pilot wall 64 defines an axial back taper 65 of about 5°. For the purposes of this description, the back taper on the pilot 58 which is directed radially inwardly from the point end 66 of the bit 20 toward the fishtail portion 56 will be considered a "positive" angle, whereas a back taper which is directed radially outwardly, as identified as 67 in FIG. 13, will be considered a "negative" back taper angle. A negligible back taper angle is shown as 69 in the embodiment shown in FIG. 12. For the purposes of this description, "negligible" means in the range from greater than minus 1° to less than positive 1°. Other parameters noted in FIG. 9 are also used in the embodiments shown in FIGS. 10 through 13 and include the pilot length "L", pilot diameter "d" and point angle 68.

Referring now to the embodiment shown in FIG. 10, it was discovered that the fishtail portion 56 will exhibit increased longevity if the fishtail angle 60 is reduced to lie in the range from about 168° to about 182°, and preferably about 170°. It has also been discovered that the pilot portion 58 will exhibit increased longevity if its diameter d is approximately one-half the nominal bit diameter D.

Yet another discovery was made that adding a chamfer portion 72, as shown in FIG. 11, significantly improves the life of the bit 20 if it were to be run at an overspeed condition. The chamfer portion 72 includes at least one chamfer 74, and in the preferred embodiment includes two chamfers. The chamfers 74 are oriented at a chamfer angle 76 which is in the range of from about 75° to about 140°, and is preferably about 90°. In the single-chamfer embodiment, the chamfer angle 78 is about 45°, or one-half the two-chamfer included angle 76. The length of the chamfer 80 is in the range of from about 5% to about 15% of the nominal diameter and is preferably about 10%. Another advantage of the chamfer is the significant reduction in creation of "discs" in composite materials. Furthermore, in the embodiment shown in FIG. 11, the included angle 68 remains at 135°, but the preferred back taper angle is in the range from 0° to 5.5°, with the preferred angle being 5°. Other tip parameters for the embodiment shown in FIG. 11 are set forth in TABLE 1.

TABLE 1

TABLE OF TIP PARAMETERS

| Nom. Bit Diam. (In.) D | Pilot Diam. (In.) d | Pilot Length (In.) L | Secondary Lip Relief Angle f2 | Fillet Radius (In.) R |
|---|---|---|---|---|
| 1/8 | .067 | .05 | 14° | .020 |
| 9/64 | .072 | .052 | 14° | .020 |
| 5/32 | .080 | .052 | 14° | .020 |
| 11/64 | .087 | .052 | 14° | .020 |
| 3/16 | .094 | .052 | 14° | .020 |
| 13/64 | .102 | .052 | 14° | .023 |
| 7/32 | .109 | .056 | 14° | .023 |
| 15/64 | .117 | .061 | 14° | .023 |
| 1/4 | .125 | .064 | 14° | .023 |
| 17/64 | .133 | .068 | 14° | .026 |
| 9/32 | .141 | .073 | 14° | .026 |
| 19/64 | .148 | .077 | 14° | .026 |
| 5/16 | .156 | .08 | 14° | .026 |
| 21/64 | .164 | .085 | 14° | .030 |
| 11/32 | .172 | .089 | 14° | .030 |
| 23/64 | .180 | .093 | 14° | .030 |
| 3/8 | .188 | .097 | 14° | .030 |
| 25/64 | .195 | .101 | 12° | .035 |
| 13/32 | .203 | .105 | 12° | .035 |
| 27/64 | .211 | .109 | 12° | .035 |
| 7/16 | .219 | .113 | 12° | .035 |
| 29/64 | .227 | .117 | 12° | .035 |
| 15/32 | .234 | .121 | 12° | .035 |
| 31/64 | .242 | .125 | 12° | .035 |
| 1/2 | .250 | .129 | 12° | .035 |

Figure 12:
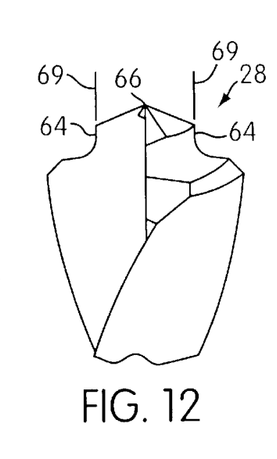
FIG. 12 is yet another embodiment of the tip portion according to the present invention.
Figure 13:
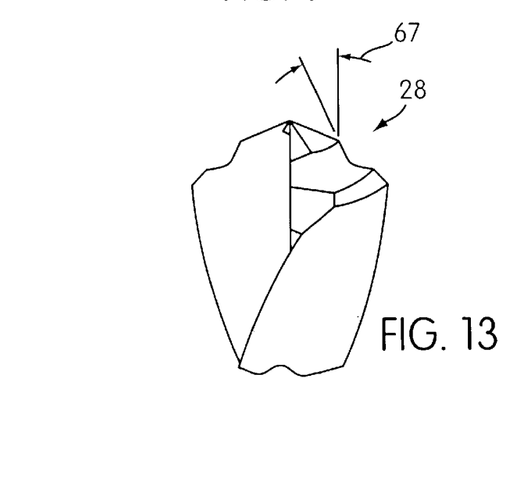
FIG. 13 is still another embodiment of the tip portion of the present invention.
Figure 14:
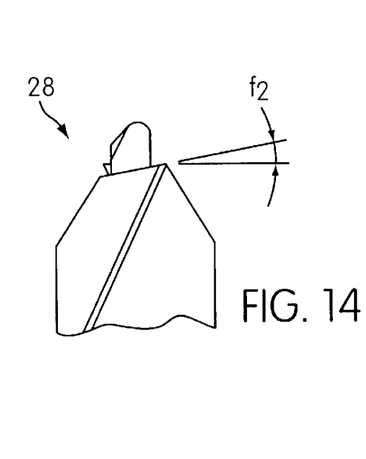
FIG. 14 is partial enlarged elevational detail view of the bit of FIG. 9 rotated to illustrate a secondary lip relief angle ("F2")

The embodiment shown in FIG. 12 is very similar to that of FIG. 11, except the back taper angle 69 is negligible. Similarly, the embodiment shown in FIG. 13 uses a negative back taper angle greater than minus 1°.

Figure 15:
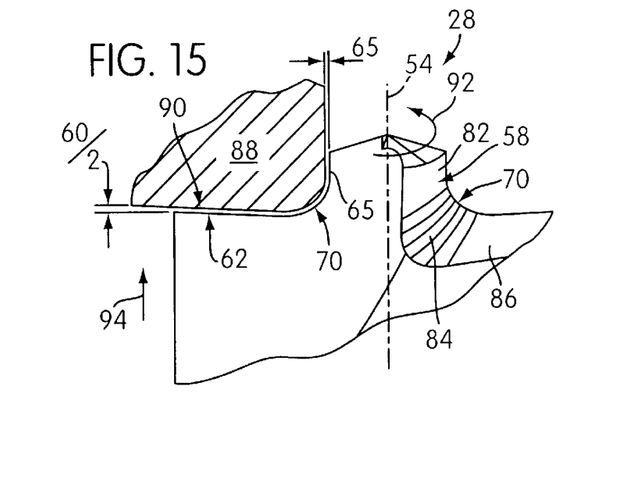
FIG. 15 is an enlarged schematic detail view of the process for forming a portion of the tip portion of FIG. 9.

Referring now to FIG. 15, the process for generating the pilot portion 58, the fishtail portion 56 and the radially-relieved fillet 70 is shown. The area of the pilot diameter relief is shown at 82; the fillet relief area is shown at 84, and the area of fishtail cutting lips relief is shown as 86. It will be appreciated that in the drill bit of FIG. 15, a continuous cutting edge is created by the fishtail cutting lip 62, fillet edge 71 and pilot wall cutting edge 65. In order to enable these edges to cut satisfactory, they all must be provided with relief surfaces as shown in FIG. 15, and as discussed in Chaconas et al, cited above. To form such surfaces, a grinding wheel 88 having a grinding wheel face 90 is oriented with the bit axis 54, such that the fishtail angle 60 divided by two is in the desired range. The pilot back taper angle 65 (positive or negative) is achieved by providing the grinding wheel 88 with a predetermined form, which also defines the shape of the fillet 70. To generate the desired edges and surfaces, the bit is positioned in the desired angular relationship to the grinding wheel 88 and is rotated about its axis 54 in the direction shown by arrow 92 and at the same time is moved into the wheel in the direction shown by arrow 94, thereby achieving the reliefs for the cutting edge 65, 71 and 62. The process is repeated on the opposite side of the bit to generate both sets of cutting edges and reliefs.

Returning now to the web thickness taper rate of the present invention, it was discovered that a modification to the Standard flute lengths resulted in benefits both in reducing variations in flute length tolerances as well as in creating a special marking zone "MZ" where such indicia 96 as bit size may be formed, to thereby stay clear of the jaws of the drill chuck to which the bit is inserted (see FIG. 4). This means that the drill chuck will not eradicate the size markings from the shank, as often happens in conventional drill bits.

Figure 8:
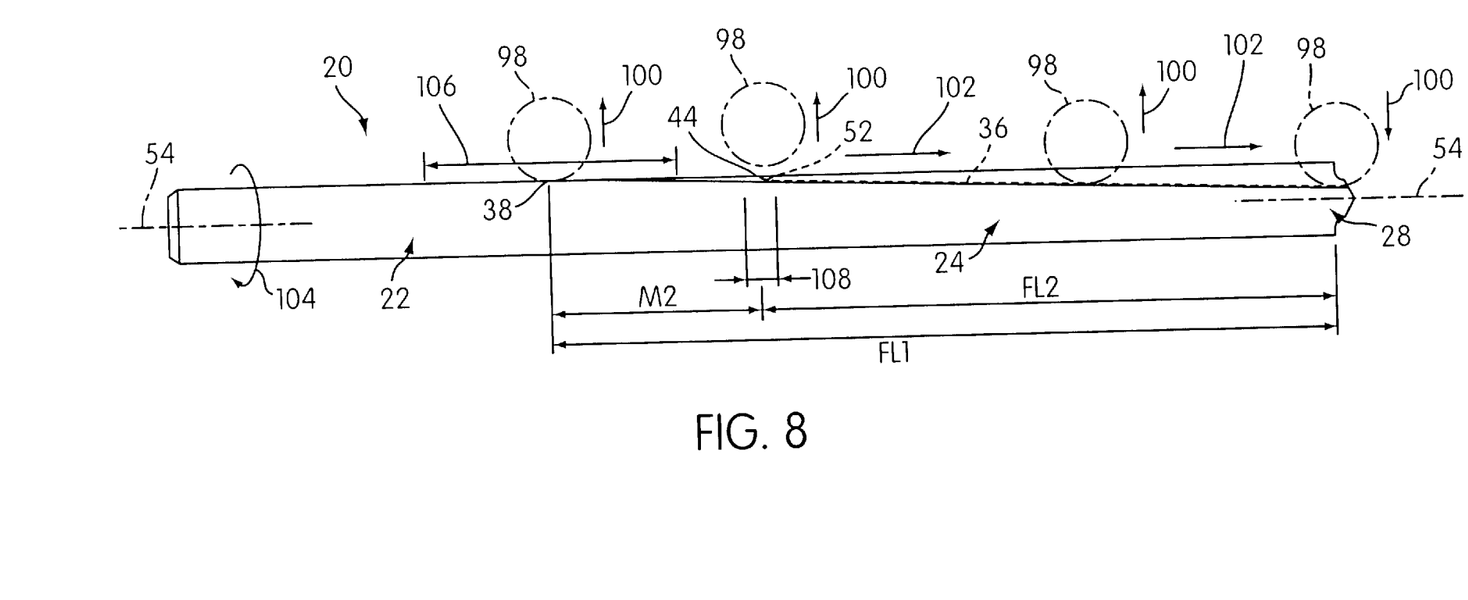
FIG. 8 is an elevational schematic view of the process for forming the web taper rate of the present invention.

Again referring to FIG. 8, a grinding wheel 98 is positioned at a predetermined angle relative to the axis 54 of drill bit 20 and is brought radially inwardly into contact with the bit at the tip portion 28, or starting point of the flute, as shown by arrow 100. The bit stock 20 and the grinding wheel 98 are then caused to have relative movement towards one another along an axial direction 102. In the preferred embodiment, the grinding wheel 98 is held for movement only in the radially inward and outward directions as shown by arrows 100, and the bit stock 20 is moved axially into the grinding wheel. A cam then causes the grinding wheel 98 to move radially outwardly while the bit stock moves into it, thereby creating a desired web taper rate. If the grinding wheel 98 producing the taper rate of the present invention were to be retracted at the termination point 38, creating a flute length FL1 corresponding to the flute length recommended by the Standards, the variation in manufacturing tolerances of the grinding wheel and bit, in combination with the taper angle, would create a flute length FL1 of unacceptable breadth of variability as shown at 106. Inasmuch as the flute length is a very important parameter in the manufacture of twist drill bits, it is preferable to maintain such variations to be within a plus or minus 1/8", namely 1/4", in breadth. To reduce the variation in flute length tolerances, it was discovered that if the grinding wheel 98 were retracted radially outwardly at termination point 44, rather than at 38, the variation in flute lengths could be significantly reduced. The point of retraction is determined by the flute length FL1 diminished by amount MZ, where MZ is in the range of from 0.3 inch to about 0.7 inch, and preferably about 1/2 inch.

The process is completed when a second flute is formed diametrically opposite the flute just described using the same process. In the preferred embodiments, the process forms a modified parabolic flute.

Although the web thickness taper rate of drill bits of the present invention is believed to significantly improve the strength of drill bits having conventional point geometry, as schematically shown in FIG. 6, it was particularly effective in enhancing the durability of drill bits having tip configurations 28 shown in FIGS. 9 through 13. The coaction of the web taper rate, pilot width, back taper angle, and chamfer of the embodiment shown in FIG. 11, will produce a twist drill bit of significantly improved strength overall while keeping the versatility that has help make it a commercial success.

The above-described embodiments, of course, are not to be construed as limiting the breath of the present invention. Modifications, and other alternative constructions, will be apparent which are within the spirit and scope of the invention as defined in the appended claims.

What is claimed is:

1. A twist drill bit, comprising:

a shank portion, a fluted portion and a tip portion adjacent the fluted portion;

the fluted portion defining two flutes extending from the tip portion and terminating at the shank portion, the flutes having a predetermined flute length;

the fluted portion further defining a web;

the web adjacent the tip portion having a predetermined web thickness; and the web thickness increasing from the tip portion to the shank portion at a uniform taper rate in the range of from about 0.050 inch to about 0.071 inch per inch of flute length.

2. The drill bit claimed in claim 1, wherein the bit has a predetermined nominal diameter, and wherein the flute length lies in the range of from about 0.3 inch to about 0.7 inch less than the flute length specified for said predetermined diameter by the ASME B94.11-M-1993 Standard or its current revision, whichever Standard is later.

3. The drill bit claimed in claim 2, and wherein the flute length is approximately one-half inch less than the flute length specified for said predetermined diameter by the ASME B94.11-M-1993 Standard or its current revision, whichever Standard is later.

4. The drill bit claimed in claim 1, further comprising a bit marking zone on the shank portion adjacent the termination of said flutes, the axial length of the bit marking zone being in the range of from about 0.3 inch to about 0.7 inch, and wherein the bit is marked in said bit marking zone with predetermined indicia.

5. The drill bit claimed in claim 1, further comprising a bit marking zone on the shank portion adjacent the termination of said flutes, the axial length of the bit marking zone being approximately one-half inch, and wherein the bit is marked in said bit marking zone with size indicia.

6. The drill bit claimed in claim 1, wherein:
the tip portion includes a fishtail portion and a pilot portion extending axially outwardly from the fishtail portion in a direction away from the shank portion;
the fishtail portion having a predetermined diameter and cutting lips arranged in a predetermined fishtail angle; and
the pilot portion having a predetermined diameter smaller than the fishtail portion diameter.

7. The drill bit claimed in claim 6, wherein the pilot portion defines an outer surface having a back taper extending toward the fishtail portion in an axial direction at a predetermined back taper angle.

8. The drill bit claimed in claim 6, wherein said fishtail angle is less than 180°.

9. The drill bit claimed in claim 8, wherein said fishtail angle lies in the range of from about 168° to about 178°.

10. The drill bit claimed in claim 9, wherein said fishtail angle is about 170°.

11. The drill bit claimed in claim 7, wherein said back taper angle is positive.

12. The drill bit claimed in claim 11, wherein said back taper angle lies in the range of from about 1° to about 5.5°.

13. The drill bit claimed in claim 12, wherein said back taper angle is about 5°.

14. The drill bit claimed in claim 7, wherein said back taper angle is at least 1° negative.

15. The drill bit claimed in claim 7, wherein said back taper angle is negligible.

16. The drill bit claimed in claim 6, wherein said pilot portion defines pilot cutting lips formed in a web-thinned point.

17. The drill bit claimed in claim 16, wherein said pilot portion defines a split point.

18. The drill bit claimed in claim 6, wherein said fishtail portion further includes a chamfered portion.

19. The drill bit claimed in claim 18, wherein the chamfered portion is adjacent said cutting lips and has a chamfer extending at a predetermined chamfer angle with respect to the axis of said drill bit radially outwardly from at least one of said cutting lips and in an axial direction towards said shank portion.

20. The drill bit claimed in claim 19, wherein a chamfer connects each cutting lip to the outer diameter of the drill bit.

21. The drill bit claimed in claim 20, wherein there are two chamfers, and the two chamfers define a chamfer included angle in the range of from about 75° to about 140°.

22. The drill bit claimed in claim 21, wherein the chamfer included angle is about 90°.

23. The drill bit claimed in claim 19, wherein the chamfer angle is about 45°.

24. The drill bit claimed in claim 6, wherein the diameter of the pilot portion lies in the range of about 38 percent to about 52 percent of the nominal drill bit diameter.

25. The drill bit claimed in claim 24, wherein the diameter of the pilot portion is approximately one-half of the nominal drill bit diameter.

26. The drill bit claimed in claim 1, wherein the drill bit is a Jobber-length, straight-shank drill bit.

27. The drill bit claimed in claim 1, wherein size indicia are formed on the shank portion outside the area to be engaged by the chuck jaws of a power drill.

28. The drill bit claimed in claim 1, wherein the flutes are parabolic.

29. The drill bit claimed in claim 6, wherein the fishtail angle is approximately 180°.

30. The drill bit claimed in claim 6, wherein the fishtail angle is greater than 180°.

31. The drill bit claimed in claim 2, wherein the flute terminates at the shank in a radiused portion.

32. A Jobber-length, straight-shank twist drill bit, comprising:
a shank, a flute having a flute length, and a tip;
the bit defining a longitudinal axis;
the flute length being determined by ASME B94.11M-1993 Standard for Jobber-length drill bits, or its current revision, whichever Standard is later;
the radially-innermost point on said flute located a predetermined distance 1/2T from said axis at said tip; and
wherein T increases along said bit at a uniform taper rate which is at least twice the web thickness taper specified for Type "B" drill bits by the latest revision of the NAS907 Standard.

33. The drill bit claimed in claim 32, wherein:
said bit includes two flutes; and
wherein the flutes define a web having a predetermined web thickness T at said tip.

34. The drill bit claimed in claim 33, wherein the flute length is less than said ASME B94.11M-1993 Standard flute length by an amount lying in the range of from 0.3 to 0.7 inches.

35. The drill bit claimed in claim 34, wherein said amount is about one-half inch.

36. The drill bit claimed in claim 33, wherein the flutes terminate at said shank at a termination point, and wherein size indicia are formed in said shank adjacent said termination point.

37. The drill bit claimed in claim 36, wherein said size indicia are formed in said shank at an axial distance from said termination point no greater than about one-half inch.

38. A self-centering, Jobber-length, straight-shank twist drill bit defining an axis, comprising:
a shank, two flutes having a flute length, a tip defining a split point, and wherein the bit length for any nominal bit diameter being determined by the ASME B94.11M-1993 Standard or its current revision, whichever Standard is later;
the flutes defining a predetermined web thickness T at said tip and having a flute length determined by said ASME Standard, less an amount lying within the range of from about 0.3 inch to about 0.7 inch;
said web thickness T having a uniform taper rate over substantially the entire flute length which is about twice the web thickness taper specified for Type "B" drill bits by the latest revision of the NAS 907 Standard;

the tip further defining a fishtail portion and a pilot portion extending outwardly from the fishtail portion in a direction away from said shank;

the fishtail portion having a predetermined diameter and cutting lips arranged in a predetermined fishtail angle;

the pilot portion having a predetermined diameter smaller than said fishtail portion diameter, and further defining an outer surface having a back taper extending toward the fishtail portion in an axial direction at a predetermined back taper angle; and the fishtail portion further having a chamfered portion adjacent the outer diameter of said bit and defining a chamfered cutting lip lying along a predetermined chamfer angle, the chamfer angle being measured in relation to the bit axis.

39. The self-centering drill bit claimed in claim 38, wherein the diameter of said pilot portion is about one-half the nominal bit diameter.

40. The self-centering drill bit claimed in claim 39, wherein the split point is formed on said pilot portion.

41. The self-centering drill bit claimed in claim 38, wherein the back taper angle is positive.

42. The self-centering drill bit claimed in claim 38, wherein the fishtail angle is less than 180°.

43. The self-centering drill bit claimed in claim 38, wherein the fishtail portion defines two chamfered portions, each chamfered portion defining a chamfered cutting lip, and wherein the included angle between the chamfered cutting lips is about 90°.

44. The self-centering drill bit claimed in claim 38, wherein the web thickness taper rate lies within the range of about 0.051 inch per inch to about 0.057 inch per inch.

45. The self-centering drill bit claimed in claim 44, wherein the web thickness T at said tip, for a Jobber-length drill bit of a particular type specified in said NAS Standard, is determined by the NAS Standard for that particular type.

46. The self-centering drill bit claimed in claim 38, wherein the web thickness taper rate lies within the range of about 0.065 inch to about 0.071 inch per inch.

47. A Jobber-length, straight-shank twist drill bit for drilling metal and wood, comprising:

a shank, two flutes having a flute length, and a tip;

the flutes defining a web having a uniform web taper rate along substantially the entire flute length in the range of from about 0.050 to about 0.071 inch per inch; and wherein for any given nominal bit diameter of 0.250 inch or greater, the flute length is selected so that when drilling a piece of wood 1-½" thick, the operator does not have to clear the flutes of sawdust and can drill through the entire thickness of the wood in one pass.

48. The drill bit claimed in claim 47, wherein the tip defines a split point and the bit is self-centering.

49. The drill bit claimed in claim 48, wherein said split point is formed on a pilot portion having a diameter smaller than the nominal diameter of the drill bit.

50. The drill bit claimed in claim 49, wherein the flute length is about one-half inch less than the flute length specified for a particular nominal bit diameter by the ASME B94.11-M-1993 Standard, or its current revision, whichever Standard is later.

51. A process for making a straight-shank twist drill bit having a tip, a shank and two flutes defining a predetermined web thickness at the tip, comprising:

orienting a grinding wheel having a predetermined diameter at a predetermined angle relative to the axis of a piece of drill bit stock for generally transverse movement towards and away from said drill bit stock;

aligning said grinding wheel with the tip of said drill bit stock to remove a sufficient amount of material to create a predetermined web thickness at said tip when said two flutes have been formed; and causing relative axial movement between said grinding wheel and said drill bit stock while rotating said drill bit stock about its axis to grind a flute having a predetermined flute length in said bit, such that said flute has a uniform web-thickness taper rate lying in the range of from about 0.050 inch to about 0.071 inch per inch of flute length over substantially the entire length of said flute.

52. The process claimed in claim 51, further comprising retracting said grinding wheel from contact with said drill bit stock upon reaching a point which is a predetermined distance prior to the point at which the flute would terminate at the shank if said taper rate were maintained.

53. The process claimed in claim 52, wherein said predetermined distance is approximately one-half inch.

54. The process claimed in claim 52, further comprising forming a second flute diametrically opposite said first flute in said bit stock using the same process set forth in claim 52.

55. The process claimed in claim 51, wherein said predetermined angle lies in the range of from about 20° to about 40°.

56. The process claimed in claim 55, wherein said predetermined angle is about 30°.

57. A twist drill bit, comprising:

a shank portion, a fluted portion and a tip portion adjacent the fluted portion;

the fluted portion defining two flutes extending from the tip portion and terminating at the shank portion, the flutes having a predetermined flute length;

the fluted portion further defining a web;

the web adjacent the tip portion having a predetermined web thickness; and the web thickness increasing from the tip portion to the shank portion wherein during peak force failure the bit breaks in said shank portion.

58. The twist drill bit of claim 57 wherein the web thickness increases from the tip portion to the shank at a uniform taper rate in the range of from about 0.050 inch to about 0.071 inch per inch of flute length.

* * * * *